(12) United States Patent
Durand et al.

(10) Patent No.: US 11,639,044 B2
(45) Date of Patent: May 2, 2023

(54) SELF-ADHESIVE PERVIOUS MEMBRANE AND METHOD FOR MANUFACTURING SUCH A SELF-ADHESIVE PERVIOUS MEMBRANE

(71) Applicant: ADHEX TECHNOLOGIES, Chenove (FR)

(72) Inventors: Hervé Durand, Dijon (FR); Hervé Lluch, Chaux (FR); Alain Guillemet, Fontaine les Dijon (FR)

(73) Assignee: ADHEX TECHNOLOGIES, Chenove (FR)

( * ) Notice: Subject to any disclaimer, the term of this patent is extended or adjusted under 35 U.S.C. 154(b) by 360 days.

(21) Appl. No.: 15/578,675

(22) PCT Filed: Jul. 19, 2016

(86) PCT No.: PCT/EP2016/067184
§ 371 (c)(1),
(2) Date: Dec. 27, 2017

(87) PCT Pub. No.: WO2017/021140
PCT Pub. Date: Feb. 9, 2017

(65) Prior Publication Data
US 2018/0118981 A1    May 3, 2018

(30) Foreign Application Priority Data
Jul. 31, 2015   (FR) .................................. FR1557428

(51) Int. Cl.
*B32B 5/02*     (2006.01)
*B32B 27/12*    (2006.01)
(Continued)

(52) U.S. Cl.
CPC .............. *B32B 5/022* (2013.01); *B32B 27/12* (2013.01); *C09J 7/21* (2018.01); *C09J 7/22* (2018.01);
(Continued)

(58) Field of Classification Search
None
See application file for complete search history.

(56) References Cited

U.S. PATENT DOCUMENTS

| 9,562,174 B2 | 2/2017 | Russell |
| 2004/0180195 A1 | 9/2004 | Macuga |

(Continued)

FOREIGN PATENT DOCUMENTS

| WO | 2004/051019 A1 | 6/2004 |
| WO | 2004/082932 A1 | 9/2004 |
| WO | 2009/127819 A1 | 10/2009 |

OTHER PUBLICATIONS

Written Opinion of the International Searching Authority dated Sep. 30, 2016, issued in corresponding International Application No. PCT/EP2016/067184, filed Jul. 19, 2016, 5 pages.
(Continued)

*Primary Examiner* — Alicia Chevalier
*Assistant Examiner* — Elaine M Vazquez
(74) *Attorney, Agent, or Firm* — Christensen O'Connor Johnson Kindness PLLC

(57) ABSTRACT

A self-adhesive vapor-permeable membrane for use on a building, comprising a support that is permeable to air and water vapor, and a pressure-sensitive adhesive layer that is permeable to air and water vapor, and is secured to the underside of the support, wherein the membrane is noteworthy in that it comprises gas bubbles trapped between the support and the adhesive layer.

11 Claims, 2 Drawing Sheets

(51) Int. Cl.

| | |
|---|---|
| *E04B 1/62* | (2006.01) |
| *E04D 12/00* | (2006.01) |
| *C09J 7/21* | (2018.01) |
| *C09J 7/29* | (2018.01) |
| *C09J 7/38* | (2018.01) |
| *C09J 7/22* | (2018.01) |
| *C09J 7/24* | (2018.01) |
| *C09J 7/25* | (2018.01) |
| *C08K 9/10* | (2006.01) |
| *C09J 157/06* | (2006.01) |

(52) U.S. Cl.
CPC ............... *C09J 7/243* (2018.01); *C09J 7/25* (2018.01); *C09J 7/29* (2018.01); *C09J 7/38* (2018.01); *C09J 7/385* (2018.01); *E04B 1/625* (2013.01); *E04D 12/002* (2013.01); *B32B 2255/02* (2013.01); *B32B 2255/26* (2013.01); *B32B 2307/72* (2013.01); *B32B 2307/724* (2013.01); *B32B 2307/726* (2013.01); *B32B 2309/105* (2013.01); *B32B 2405/00* (2013.01); *B32B 2419/00* (2013.01); *B32B 2419/06* (2013.01); *C08K 9/10* (2013.01); *C09J 157/06* (2013.01); *C09J 2301/302* (2020.08); *C09J 2301/304* (2020.08); *C09J 2301/312* (2020.08); *C09J 2301/40* (2020.08); *C09J 2301/408* (2020.08); *C09J 2301/412* (2020.08); *C09J 2400/263* (2013.01); *C09J 2423/046* (2013.01); *C09J 2423/106* (2013.01); *C09J 2433/00* (2013.01); *C09J 2467/006* (2013.01); *C09J 2477/006* (2013.01); *C09J 2483/006* (2013.01); *Y10T 428/249953* (2015.04); *Y10T 428/2809* (2015.01)

(56) References Cited

U.S. PATENT DOCUMENTS

| | | | |
|---|---|---|---|
| 2005/0214496 A1 | 9/2005 | Borenstein | |
| 2010/0101723 A1* | 4/2010 | Okamoto | C09J 133/08 156/306.6 |
| 2011/0185666 A1* | 8/2011 | Russell | B32B 7/12 52/408 |
| 2013/0078407 A1* | 3/2013 | Shimokuri | C09J 133/08 428/41.8 |
| 2016/0024782 A1* | 1/2016 | Bess | B32B 5/00 428/41.5 |
| 2016/0230392 A1* | 8/2016 | Tang | E04D 5/148 |

OTHER PUBLICATIONS

International Preliminary Report on Patentability dated Feb. 6, 2018, issued in corresponding International Application No. PCT/EP2016/067184, filed Jul. 19, 2016, 1 page.
International Search Report dated Sep. 30, 2016, for International Application No. PCT/EP2016/067184, filed Jul. 19, 2016, 5 pages.
Written Opinion dated Sep. 30, 2016 for International Application No. PCT/EP2016/067184, filed Jul. 19, 2016, 5 pages.

\* cited by examiner

SELF-ADHESIVE PERVIOUS MEMBRANE AND METHOD FOR MANUFACTURING SUCH A SELF-ADHESIVE PERVIOUS MEMBRANE

TECHNICAL FIELD

The present invention relates to a membrane that is self-adhesive and permeable to air and water vapor and its method of manufacture. Such a membrane is intended for the field of construction of buildings and, in particular, it is intended to be applied to walls and/or under the roof to control the flow of water vapor and air.

PRIOR ART

It is well known in the field of building construction that moisture problems in walls are attributed to two main actions, namely the diffusion of water vapor and air leakage. Air leakage and the diffusion of water vapor through the walls may cause many problems such as crumbling masonry, freezing pipes, condensation and ice accumulation in cavities, as well as humidification of the insulation, rendering it inoperative and, in particular, the growth of mold.

The uncontrolled movement of air and water vapor through the building envelope is caused by pressure differences generated by the wind. Air leakage may be the result of cracks or faulty joints between construction elements and structural elements or through porous materials such as concrete blocks and porous insulation materials.

In order to limit these moisture problems, it is customary to use barrier films or vapor barrier films, such as a polyethylene film, to control the movement of water vapor in the building envelope. The vapor barrier film delays the diffusion of water through all the materials in the walls since the rate at which the water vapor migrates or diffuses through a material depends on two factors: the difference between the water vapor pressure in the air inside the building and the water vapor pressure in the air outside the building, and the resistance of the materials to water migration by diffusion. Vapor barrier films provide greater resistance to water vapor diffusion than most other materials. Thus, polyethylene films of sufficient thickness are most commonly used for this purpose; However, other materials such as aluminum foil or some paints or adhesives have also been used as vapor barriers.

However, these vapor barrier films are not sufficient in themselves and it is necessary to include an air barrier film to prevent outside air from entering the building. In fact, moisture-laden air passing through an insulated cavity with a vapor barrier film may deposit more moisture than the vapor barrier is able to diffuse in the same amount of time.

Thus, air barrier films permeable to vapor have been developed, such as the products sold under the name Blueskin® by the American company Bakor® consisting of a water vapor permeable, moisture-resistant and self-adhesive air barrier membrane. These products correspond to the products described in U.S. Pat. No. 6,901,712 filed by the company Bakor® which describes an air barrier film permeable to vapor consisting of a sheet that is permeable to water vapor and made from polyethylene and modified polyolefins, on a surface of which an adhesive is applied as a non-continuous film.

Although this type of vapor barrier film does not require fastening means for fixing the film on a wall or the like, the adhesive used on these films is not permeable to air and water vapor so that it limits the water permeability of the film to those parts of the film without adhesive.

In order to overcome this drawback, vapor barrier films having a continuous layer of pressure-sensitive adhesive which is permeable to water vapor have already been devised. This is, in particular, the case in the international patent application WO 2009/127819 which discloses a self-adhesive permeable membrane sheet intended to be used in a building structure, and which comprises a continuous layer of a pressure-sensitive permeable adhesive applied to a surface of a permeable membrane sheet. The membrane sheet is made of a laminar structure comprising a spunbonded polypropylene layer, a meltblown polyester layer and a spunbonded polypropylene layer and a pressure-sensitive adhesive layer comprising an agent permeable to air comprising a water-absorbent resin, polypropylene glycol and water, and a crosslinking agent. It should be noted that, in accordance with the teachings of the prior art, the pressure-sensitive adhesive layer does not contain air bubbles in order to avoid delamination as described, in particular, in the documents EP0670277 and EP2108687.

Nevertheless, this type of vapor barrier film has the disadvantage of being expensive to manufacture and providing a permeability which, in particular. degrades over time. Permeability is understood to mean the ability of a membrane or surface to allow water vapor to pass through.

There is therefore a need for a vapor barrier film of simple and inexpensive design providing, in particular, good constant permeability over time.

DISCLOSURE OF THE INVENTION

One of the aims of the invention is, therefore, to overcome these disadvantages by providing a vapor barrier film of simple and inexpensive design providing good constant permeability over time.

For this purpose and in accordance with the invention, a self-adhesive vapor-permeable membrane is provided for use on a building, comprising a support that is permeable to air and water vapor and an adhesive layer that is sensitive to pressure, permeable to air and water vapor, and secured to the underside of the support; wherein the membrane is noteworthy in that it comprises gas bubbles trapped between the support and the adhesive layer It is clear that, unlike the membranes of the prior art, the membrane according to the invention comprises a continuous adhesive layer, permeable to air and water vapor, of simple composition and inexpensive, stable over time and providing the entire membrane with constant permeability over time.

Preferably, the gas bubbles have a diameter smaller than the thickness of the adhesive layer.

Furthermore, the gas bubbles preferably have a diameter smaller than or equal to 50 µm, while the adhesive layer has a thickness smaller than or equal to 200 µm, and preferably a thickness of 130 µm.

In addition, the adhesive layer has an area density of between 100 and 160 g/m² and, preferably, an area density of 130 g/m².

The adhesive layer is preferably obtained in a polar pressure-sensitive adhesive, preferably crosslinked, and preferably acrylic.

Preferably, the adhesive is a UV-crosslinked and tackified acrylic hotmelt adhesive.

Furthermore, the support consists of a micro-perforated polyethylene (PE) film, a micro-perforated polypropylene (PP) film, a micro-perforated polyethylene (PE)/polypropylene (PP) copolymer film, and a stretched polyethylene (PE) film, a stretched polypropylene (PP) film, a stretched polyethylene (PE)/polypropylene (PP) copolymer film, a polyether-based extruded polyurethane (TPU) thermoplastic film, a breathable thermoplastic film based on polyurethane and polyether-block amide base, a polyamide 6-6 film (PA 6-6), or a combination of these films.

Alternatively, the support may be a nonwoven support based on synthetic fibers chosen from polyethylene (PE), polypropylene (PP), polyethylene terephthalate (PET) and polyamide (PA), or a combination thereof.

Furthermore, the support preferably consists of a laminar film comprising at least:
- an upper layer consisting of a nonwoven polypropylene film,
- a lower layer consisting of a nonwoven polypropylene film, and
- a central layer extending between the upper and lower layers and consisting of a breathable film.

Another object of the invention relates to a process for manufacturing a self-adhesive membrane permeable to water vapor for use on a building, comprising a support that is permeable to air and water vapor, and a pressure-sensitive adhesive layer that is permeable to air and water vapor and is integral with the underside of the support; wherein the method is noteworthy in that it comprises a step of depositing a pressure-sensitive adhesive layer that is permeable to air and water vapor by trapping gas bubbles between the support and the adhesive layer.

Preferably, the gas bubbles trapped between the support and the adhesive layer have a diameter smaller than the thickness of the adhesive layer.

According to a first variant of the method according to the invention, the step of depositing the adhesive layer consists at least in the following steps:
- deposition of an acrylic adhesive on a silicone protective film,
- crosslinking of the adhesive, and
- transferring the adhesive to the support.

According to a second variant of the method according to the invention, the step of depositing the adhesive layer consists in depositing an acrylic adhesive on the support.

Preferably, the air bubbles have a diameter less than or equal to 50 µm, while the adhesive layer has a thickness less than or equal to 200 µm, and preferably a thickness of 130 µm.

Furthermore, the adhesive layer has an area density of between 100 and 160 g/m² and, preferably, an area density of 130 g/m².

The adhesive layer is preferably obtained in a polar pressure-sensitive adhesive, preferably crosslinked, and preferably acrylic.

Preferably, the adhesive is a UV-crosslinked and tackified acrylic hotmelt adhesive.

Furthermore, the support consists of a micro-perforated polyethylene (PE) film, a micro-perforated polypropylene (PP) film, a micro-perforated copolymer film polyethylene (PE)/polypropylene (PP), a stretched polyethylene (PE) film, a stretched polypropylene film (PP), a stretched polyethylene (PE)/polypropylene (PP) copolymer film, an extruded thermoplastic polyurethane (TPU) film based on polyether, a breathable thermoplastic film based on polyurethane and polyether-block amide base, a polyamide 6-6 film (PA 6-6), or a combination of these films.

Alternatively, the support may be a nonwoven support based on synthetic fibers chosen from polyethylene (PE), polypropylene (PP), polyethylene terephthalate (PET) and polyamide (PA) or a combination thereof.

Furthermore, the support preferably consists of a laminar film comprising at least:
- an upper layer consisting of a nonwoven polypropylene film,
- a lower layer consisting of a nonwoven polypropylene film, and
- a central layer extending between the upper and lower layers and consisting of a breathable film.

BRIEF DESCRIPTION OF THE DRAWINGS

Other advantages and features will become apparent from the following description of several variant embodiments, given by way of non-limiting examples, of the self-adhesive membrane and of its manufacturing method according to the invention, based on the attached drawings wherein.

EMBODIMENT OF THE INVENTION

For the sake of clarity, in the remainder of the description, the same elements are designated by the same references in the various figures. In addition, the various views are not drawn to scale.

Hereinafter is described a self-adhesive membrane permeable to water vapor and its manufacturing method wherein it is particularly intended for the construction of buildings; However, it is obvious that the membrane according to the invention may find many other applications without departing from the scope of the invention.

Figure 1:
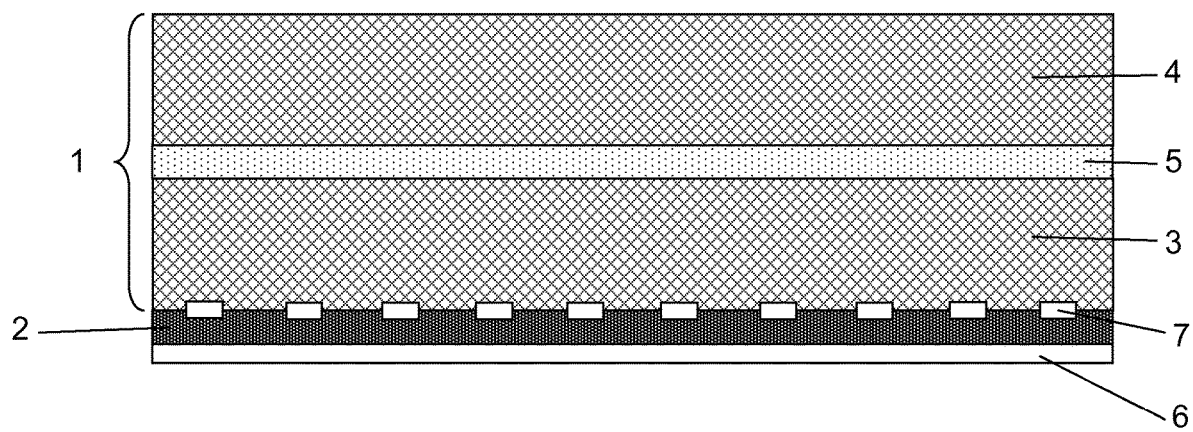
FIG. 1 shows a schematic sectional view of a vapor barrier film according to the invention.

With reference to FIG. 1, the membrane permeable to water-vapor according to the invention consists of a support 1 that is permeable to air and to water vapor, and an adhesive layer 2 that is sensitive to pressure and is permeable to air and water vapor, and is secured to the underside of the support 1. The support 1 consists of a micro-perforated polyethylene (PE) film, a micro-perforated poly-propylene (PP) film, a micro-perforated polyethylene (PE)/polypropylene (PP) copolymer film, a stretched polyethylene (PE) film, a stretched polypropylene (PP) film, a stretched polyethylene (PE)/polypropylene (PP) copolymer film, an extruded thermoplastic polyurethane (TPU) film based on polyether, a breathable thermoplastic film based on polyurethane and polyether-block amide base, a polyamide 6-6 film (PA 6-6), or a combination of the films. The extruded polyurethane thermoplastic (TPU) film based on a polyether may, for example, consist of a TPU film marketed by Epurex Films of Bayer Company in the Walopur® or Platilon range (for example reference 2201 AU). Furthermore, the breathable thermoplastic film based on polyurethane and polyether-block amide base may consist, for example, in a film marketed by the company Epurex films Bayer company in the range Walotex® or Pebatex® (for example references 2202 AC and ref M2234).

Alternatively, the support 1 may consist of a non-woven support based on synthetic fibers chosen from polyethylene (PE), polypropylene (PP), polyethylene terephthalate (PET) and polyamide (PA) or a combination thereof. The nonwoven support may be obtained by any method well known to persons skilled in the art, such as so-called dry methods or so-called wet methods. For example, the nonwoven support may be obtained by the so-called "spunbond" dry process comprising two main steps, a first extrusion and creation step (spun) and a fiber binding or consolidation step (bond), or by the so-called "air laid" dry process of feeding and passing the fibers through perforated rotating cylinders or dispensing systems to form a web on a conveyor belt by means of a distribution box located above a screen with a vacuum system incorporated below the screen. Alternatively, the nonwoven support may be obtained by the so-called "wet laid" wet process in which the fibers used are dispersed, triturated and then diluted with a very large amount of water to form a paste containing 0.1 to 0.25 g/l of dry material, then the pulp is sent on a draining screen of a formation unit for carrying out the formation of the fibrous mat or web through submerged formation, and finally draining of the water on suction units.

According to a preferred embodiment with reference to FIG. 1, the support 1 consists of a laminar film, i.e. a multilayer film, comprising three layers, an upper layer 3 consisting of a nonwoven polypropylene film, a lower layer 4 consisting of a nonwoven polypropylene film, and a central layer 5 extending between the upper layer 3 and lower layer 4 and consisting of a breathable film, wherein the breathable film may consist of any of the previously described films.

In addition, the adhesive layer 2 consists of a UV-crosslinked hot melt acrylic adhesive and has an area density of between 100 and 160 $g/m^2$ and, preferably, an area density of 130 $g/m^2$. This adhesive layer 2 has a thickness less than or equal to 200 μm, and preferably a thickness of 130 μm. The adhesive layer 2 is obtained in a pressure-sensitive adhesive, preferably a polar adhesive, and preferably a crosslinked adhesive. Furthermore, the adhesive is preferably based on acrylic. For example, the adhesive may consist of a solvent-phase self-crosslinking acrylic adhesive marketed by Henkel Corporation under the reference LOCTITE DURO-TAK 222A, LOCTITE DURO-TAK 1847, LOCTITE DURO-TAK 737, LOCTITE DURO-TAK 3954, DUROTAK 380-1053, or by the company AV Chemie under the reference Polytex SP 2085.

Specifically, the adhesive may consist of a self-crosslinking acrylic adhesive in a solvent phase based on acrylate copolymers (carboxylated copolymers based on acrylic esters) obtained by the polymerization of acrylic monomers such as: methyl acrylate, acrylate ethyl, 2-ethylhexyl acrylate, n-butyl acrylate, 2-hydroxyethyl acrylate, or the like. The crosslinking may be obtained by adding any crosslinking agent well known to persons skilled in the art such as a metal chellate or, for example aluminum tris(acetylacetonate) (2,4-pentanedionato-O,O').

It will be noted that the viscosity and the rheological behavior of the adhesive may easily be adjusted by the aromatic and aliphatic hydrocarbon solvent systems, such as alcoholic solvents (methanol, ethanol, propanol 2), ketone solvents (acetone, methyl ethyl ketone, pentane, 2,4 dione), aromatic solvents (toluene), cyclic aliphatic solvents (cyclohexane, methylcyclohexane), aliphatic solvents (hexane and isomers, n-heptane, octane and isomers) in order to obtain a Brookfield viscosity between 1000 mPa·s and 50000 mPa·s (LVT 3/12 rpm).

Preferably, the adhesive is a UV-crosslinked hotmelt acrylic adhesive marketed by the company Basf in the Ac Resin® range, tackified or not with tackifying resins of the hydrogenated rosin ester type (reference Foral105$^E$ marketed by the company Eastman) or hydrocarbon resins such as the resins marketed by Eastman under the reference Kristalex F85.

It should be noted that all these adhesives are permeable to air and water vapor. In particular, Ac Resin® A 250 UV adhesive offers a water vapor permeability of 949 $g/m^2/24$ h.

Incidentally, in order to protect the adhesive layer 2, the membrane according to the invention comprises a silicone protective film 6 or the like.

Figure 2:
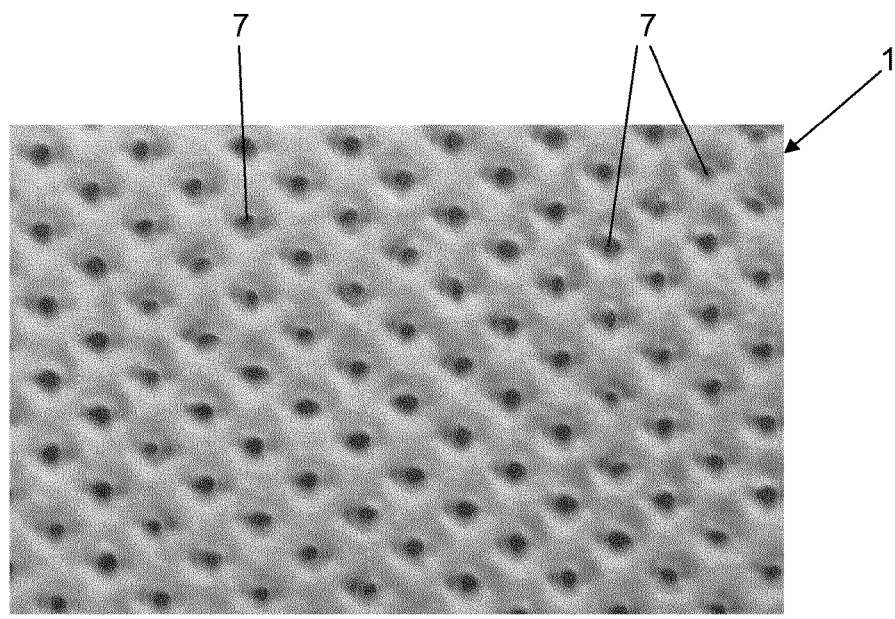
FIG. 2 shows a top view of the vapor barrier film according to the invention.

In addition, with reference to FIGS. 1 and 2, the membrane comprises gas bubbles 7 trapped between the laminar film 1 and the adhesive layer 2, wherein the gas bubbles 7 have a diameter less than the thickness of the adhesive layer 2. As best shown in FIG. 1, the bubbles 7 are partially embedded in the adhesive layer 2 and partially embedded in the laminar film 1, i.e., the support. Preferably, the gas bubbles 7 have a diameter less than or equal to 50 μm. It will be noted that the adhesive layer 2 has a simple and inexpensive composition that is stable over time and provides the entire membrane with constant permeability over time. The gas bubbles 7 form a buffer in which the excess water vapor may be stored and then released over time through the adhesive layer 2. It will be noted that the gas contained in the bubbles is preferably air; however, it goes without saying, that the gas may consist, for example, of any neutral and/or inert gas without departing from the scope of the invention.

Figure 3:
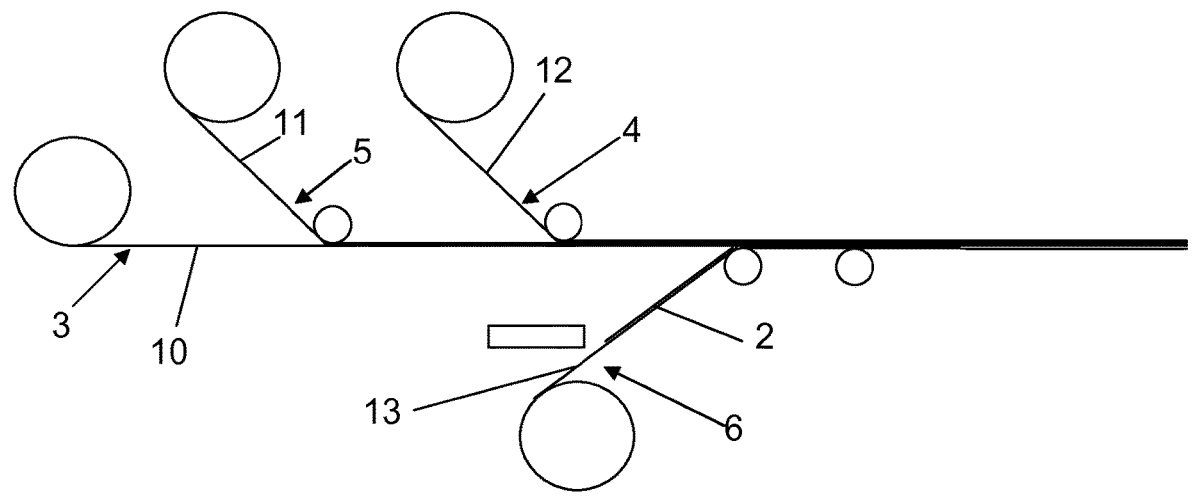
FIG. 3 shows a schematic representation of the production line for implementing the method of manufacturing the vapor barrier film according to the invention.

Referring to FIG. 3, the membrane according to the invention is manufactured from a nonwoven polypropylene film 10 forming the lower layer 3 of the laminar film 1 on which is deposited a breathable film 11 forming the central layer 5, then a nonwoven polypropylene film 12 forming the upper layer 4 of the laminar film 1 is deposited on the breathable film 11. A layer 2 of a vapor-permeable adhesive composition is deposited on a silicone protective film 13, and then the adhesive layer 2 is crosslinked before being applied to the underside of the lower layer 3 by trapping air bubbles between the lower layer 3 and the adhesive layer 2. It will be understood that persons skilled in the art will adapt the composition of the adhesive layer and the pressure exerted during the application of the adhesive layer 2 on the lower layer 3 in order to avoid expulsion of air during the transfer of the adhesive layer onto the lower layer 3.

In a direct coating process, as described above with reference to FIG. 3, a person skilled in the art will choose an adhesive mass having a viscosity of between 1000 and 50000 mPa·s and/or a coating speed of greater than 20 m/min to avoid expelling the air between the laminar film 1 and the adhesive layer 2 and to allow the formation of gas bubbles 7.

Figure 4:
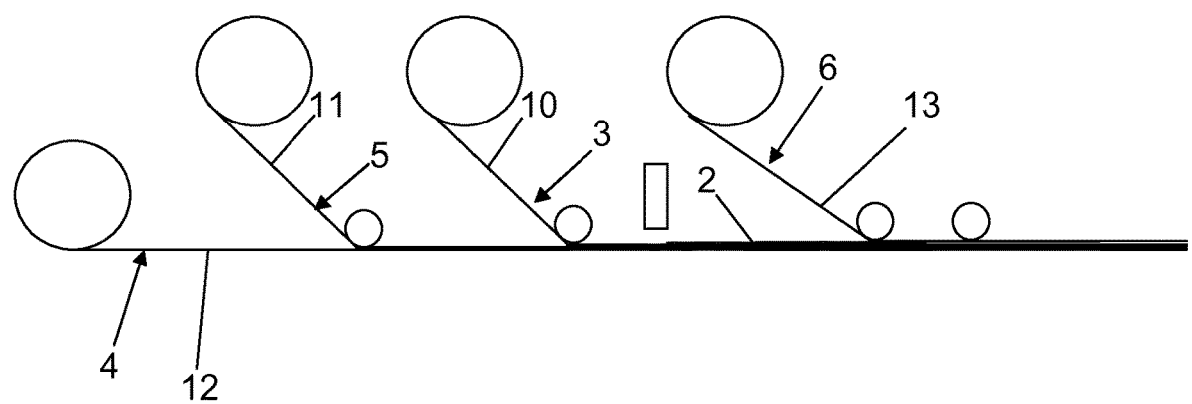
FIG. 4 shows a schematic representation of the production line for the implementation of an alternative embodiment of the method of manufacturing the vapor barrier film according to the invention.

According to an alternative embodiment, with reference to FIG. 4, the membrane according to the invention is manufactured from a nonwoven polypropylene film 12 forming the upper layer 4 of the laminar film 1 on which a breathable film 11 is deposited, and forming the central layer 5, then a nonwoven polypropylene film 10 forming the lower layer 3 of the laminar film 1 is deposited on the breathable film 11. A layer 2 of a vapor-permeable adhesive composition is deposited on the upper face of the lower layer 3, then a silicone protective film 13 is deposited on the adhesive layer 2. It will be understood that a person skilled in the art will adapt the viscosity and the temperature of the adhesive composition in order to avoid expelling air during the deposition of the adhesive layer 2 and so allow the formation of air bubbles between the lower layer 3 and the adhesive layer 2.

For example, in a process for coating the laminar film 1, as described above with reference to FIG. 4, a person skilled in the art will preferably choose a pressure of the pressing roll of less than 5 bar and/or a temperature of the pressing roll below 10° C., wherein the pressing roll comprises a rubber coating or the like, preferably having a hardness less than or equal to 80 Shore A in order to avoid the expulsion of air and allow the formation of gas bubbles 7.

Finally, it is obvious that the examples that have just been given are only specific examples that are in no way limiting as to the fields of application of the invention.

The invention claimed is:

1. A self-adhesive membrane permeable to water vapor for use on a building, the membrane comprising a support that is permeable to air and water vapor, and a pressure-sensitive adhesive layer that is permeable to air and water vapor, and is secured to the underside of the support, the membrane further comprising gas bubbles, wherein the gas bubbles comprises bubbles trapped between the support and the adhesive layer, wherein the gas bubbles are partially embedded in the adhesive layer and partially embedded in the support.

2. The self-adhesive membrane according to claim 1, wherein the gas bubbles have a diameter less than the thickness of the adhesive layer.

3. The self-adhesive membrane according to claim 1, wherein the gas bubbles have a diameter less than or equal to 50 μm.

4. The self-adhesive membrane to claim 1, wherein the adhesive layer has a thickness less than or equal to 200 μm.

5. The self-adhesive membrane according to claim 4, wherein the adhesive layer has a thickness of 130 μm.

6. The self-adhesive membrane according to claim 1, wherein the adhesive layer has an area density of between 100 and 160 g/m$^2$.

7. The self-adhesive membrane according to claim 1, wherein the adhesive layer is a UV-cross-linked tackified acrylic hot-melt pressure-sensitive adhesive.

8. The self-adhesive membrane according to claim 1, wherein the support consists of a micro-perforated polyethylene (PE) film, a micro-perforated polypropylene film (PP), a micro-perforated polyethylene (PE)/polypropylene (PP) copolymer film, a stretched polyethylene (PE) film, a stretched polypropylene (PP) film, a stretched polyethylene copolymer film (PE)/polypropylene (PP), a polyether-based extruded polyurethane (TPU) thermoplastic film, a polyurethane-based breathable thermoplastic film and a polyether-block amide base, a 6-6 polyamide film (PA 6-6), or a combination of these films.

9. The self-adhesive membrane according to claim 1, wherein the support is a nonwoven support based on synthetic fibers selected from polyethylene (PE), polypropylene (PP), polyethylene terephthalate (PET) and polyamide (PA), or a combination thereof.

10. The self-adhesive membrane according to claim 1, wherein the support consists of a laminar film comprising at least:
    an upper layer consisting of a nonwoven polypropylene film;
    a lower layer consisting of a nonwoven polypropylene film; and
    a central layer extending between the upper and lower layers and consisting of a breathable film.

11. The self-adhesive membrane according to claim 1, wherein the pressure-sensitive adhesive layer comprises an adhesive having a viscosity of between 1000 mPa·s and 50000 mPa·s.

* * * * *